(12) United States Patent
Grotendorst et al.

(10) Patent No.: US 8,457,123 B2
(45) Date of Patent: Jun. 4, 2013

(54) USE OF THE WLAN STANDARD FOR C2C COMMUNICATION BY ADDING NEW PACKET TYPES

(75) Inventors: Thomas Grotendorst, Eschborn (DE); Ulrich Stählin, Eschborn (DE)

(73) Assignee: Continental Teves AG & Co. oHG (DE)

( * ) Notice: Subject to any disclaimer, the term of this patent is extended or adjusted under 35 U.S.C. 154(b) by 202 days.

(21) Appl. No.: 12/746,080

(22) PCT Filed: Jul. 29, 2008

(86) PCT No.: PCT/EP2008/059924
§ 371 (c)(1),
(2), (4) Date: Jul. 27, 2010

(87) PCT Pub. No.: WO2009/071348
PCT Pub. Date: Jun. 11, 2009

(65) Prior Publication Data
US 2010/0284384 A1  Nov. 11, 2010

(30) Foreign Application Priority Data
Dec. 6, 2007  (DE) .................... 10 2007 059 023
Jun. 29, 2008  (DE) .................... 10 2008 035 419

(51) Int. Cl.
*H04L 12/56*   (2006.01)

(52) U.S. Cl.
USPC ............................................. 370/389

(58) Field of Classification Search
USPC .................................. 370/516, 389
See application file for complete search history.

(56) References Cited

U.S. PATENT DOCUMENTS

| | | | |
|---|---|---|---|
| 6,865,609 B1 | 3/2005 | Gubbi et al. | |
| 7,425,903 B2 * | 9/2008 | Boss et al. | 340/902 |
| 7,808,965 B2 * | 10/2010 | Kuroda et al. | 370/347 |
| 7,881,868 B2 * | 2/2011 | Greene et al. | 701/301 |
| 7,995,518 B2 * | 8/2011 | Jacquet et al. | 370/328 |
| 2007/0021133 A1 | 1/2007 | Coulas | |

FOREIGN PATENT DOCUMENTS

| | | |
|---|---|---|
| DE | 102005038588 | 8/2005 |
| EP | 1286506 A2 | 2/2003 |

* cited by examiner

*Primary Examiner* — Chandrahas Patel
(74) *Attorney, Agent, or Firm* — RatnerPrestia

(57) ABSTRACT

C2X communication is made possible efficiently via WLAN by apparatuses and a method for filtering data frames received by a vehicle from a receiver via a WLAN connection, wherein a frame type indicated in a received data frame is used to decide that device to which data in the data frame are transmitted.

15 Claims, 1 Drawing Sheet

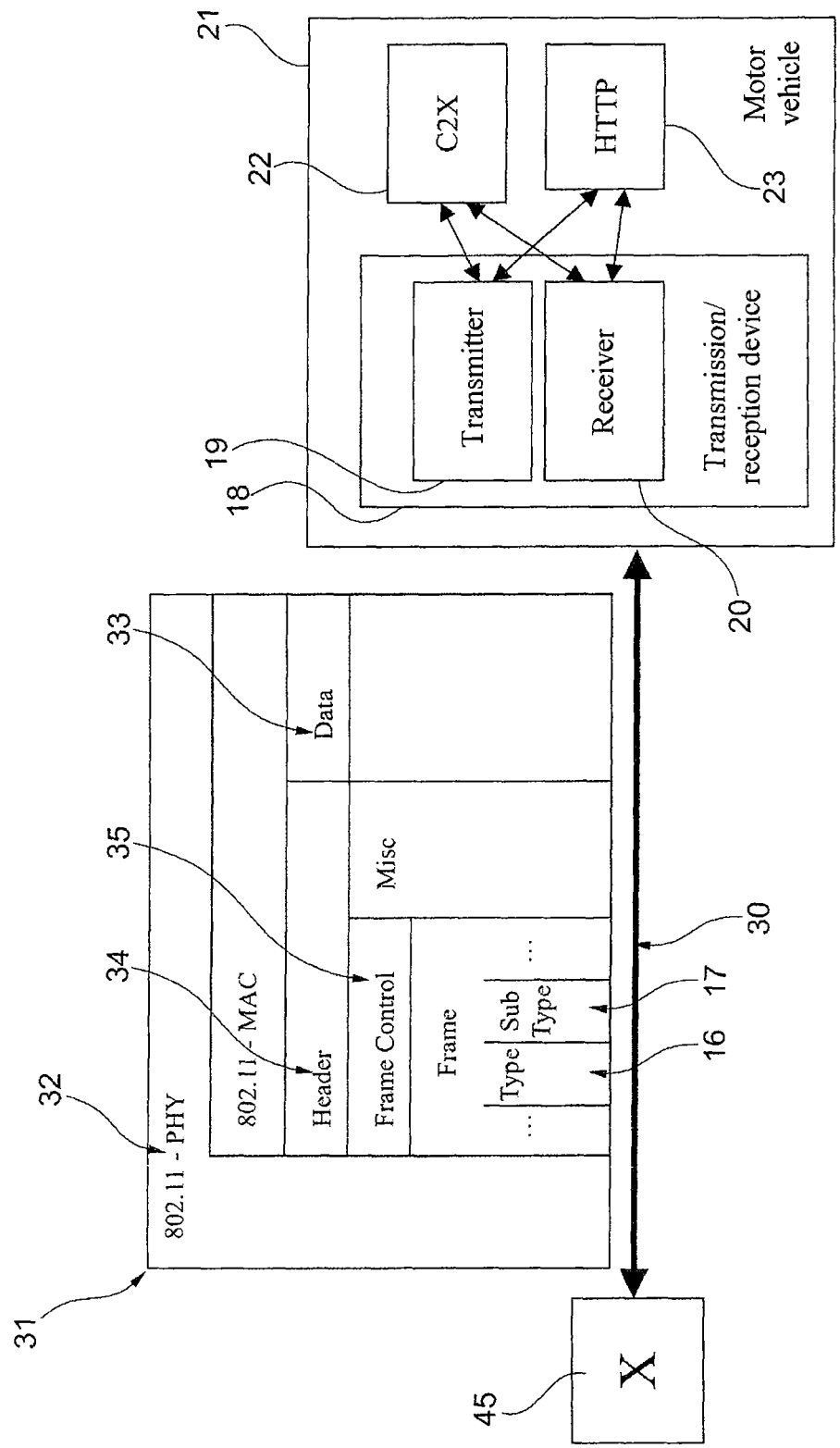

USE OF THE WLAN STANDARD FOR C2C COMMUNICATION BY ADDING NEW PACKET TYPES

CROSS REFERENCE TO RELATED APPLICATIONS

This application is the U.S. national phase application of PCT International Application No. PCT/EP2008/059924, filed Jul. 29, 2008, which claims priority to German Patent Application No. 10 2007 059 023.9, filed Dec. 6, 2007, and German Patent Application No. 10 2008 035 419.8, filed Jul. 29, 2008, the contents of such applications being incorporated by reference herein.

FIELD OF THE INVENTION

The present invention relates to methods and apparatuses for selecting data transmitted via a WLAN connection.

BACKGROUND OF THE INVENTION

The Car-to-Car Communication (C2C-Communication) discussed below is a term defined by the Car-to-Car Communication Consortium (C2C-CC), an affiliation between several automobile manufacturers. C2C-CC is developing an open industrial standard for Car-to-Car Communication and for communication between the vehicles and infrastructure devices (traffic lights, etc).

A basis for such Car-to-Car radio systems may be wireless communication systems in the form of WLANs (Wireless Local Area Networks) based on the standard defined by the IEEE under the standard descriptor 802.11, for example (see, for example: IT-Wissen, Das große Onlinelexikon für Informationstechnologie [IT Knowledge, The big online dictionary of information technology]).

C2X communication comprises C2C communication (Car-to-Car Communication) and communication between a vehicle and a further device, which is not a vehicle, such as an infrastructure device (traffic lights, etc.)

For Car-to-X-communication (C2X-communication), a WLAN implementation based on the 802.11p standard is conceivable, said standard not yet having been approved, however. This subform of the WLAN standard 802.11 is distinguished by the opportunity for ad-hoc communication and long ranges. Ad-hoc communication is a mode in which at least two subscribers (radio devices in vehicles, for example) communicate with one another spontaneously (ad hoc), with communication also being able to be effected from a subscriber to a final destination via a plurality of subscribers forwarding the communication as intermediate stations. Besides the ad-hoc mode communication, WLAN is also acquainted with an infrastructure mode, which operates using base stations (access point).

With the currently used radio standard based on IEEE/802.11a/b/g/n, commercially available WLAN routers have the drawback that they require relatively long setup times for the communication (channel setup latencies), which reduces applicability. However, said 802.11a/b/g/n standards have significantly higher data rates than 802.11p, which in turn makes them of interest for multimedia applications.

SUMMARY OF THE INVENTION

It is an object of the present invention to avoid the aforementioned drawbacks and allow efficient C2X communication.

The invention allows use of 802.11-WLAN transmission methods (particularly 802.11a or 802.11b or 802.11g or 802.11n) using commercially available WLAN radio engineering both for C2X communication and for communication of other contents (for example for Internet/http/etc. communication, "surfing" the Internet etc.) using the same WLAN radio engineering appliances in a motor vehicle. In this case, the very good range and the relatively short connection setup times of available WLAN standards such as 802.11a/b/g/n can be used efficiently. One significant implementation of the invention is the expansion of the MAC-Layers in the WLAN standard 802.11 (for example 802.11 a/b/g/n), by a data packet type (which can be used for the C2X communication according to aspects of the invention) (for example frame type 3 or frame type 2) with one of the (MAC layer header) frame subtypes 8 to 15 (which have not yet been used), which is ignored by existing WLAN implementations but which allows modified implementations to set up effective C2X communication in parallel (that is to say at the same time and/or by the same WLAN communication terminal, for example) with other WLAN communication (e.g. use of the Internet).

The invention relates to a method for filtering data transmitted to a receiver in a motor vehicle via a WLAN connection, wherein a filter device (for example an expanded MAC software driver) uses at least the frame type contained in a data frame (e.g. "3"; or "2" with subtypes) to decide about that device (device processing C2X data or device processing http data) to which the respective data frame is transferred.

In this case, the frame type of a data frame can be used to decide whether the data frame is transferred to a C2X device or to another (vehicle) device (for example device (e.g. Internet browser) processing http or Internet data further).

The decision about that device to which the data frames are transferred may involve a frame type ("3") or else a combination of a frame type and a particular (MAC layer header) frame subtype (for the frame type "2", one of the (MAC layer header) frame subtypes "8", "9", "10", "11", "12", "13", "14", "15").

The data can be transmitted using a 802.11a or b or g or n standard, in particular.

Besides filtering of received data, the invention also relates to a method for sending data frames via a data link installed in a motor vehicle, wherein from a C2X device (for example a C2X controller module in the vehicle) are provided with a frame type identifier (type 2 with subtypes 8 to 15 or type 3 etc.), whereas data to be sent which come from other vehicle devices (devices processing http/Internet/Multimedia data) are provided with another frame type identifier.

In addition, the invention relates to a reception device for a vehicle-based implementation with a filter device for deciding about the forwarding of received data frames to a C2X device (C2X) or other device (http/Internet-Browser/Multimedia etc.) using types indicated in the MAC layer header of the data frame ("3"; "2" with particular subtypes).

The invention also relates to a transmission device for implementation in a vehicle and for sending data frames, with a distinguishing device for distinguishing (prior to sending) data packets originating from a C2X device with (only or at least) one frame type ("2" with subtype 8 to 15 or "3") and for distinguishing data packets with another frame type which originate from another vehicle-based device (Internet/http/Multimedia etc.).

BRIEF DESCRIPTION OF THE DRAWING

The invention is best understood from the following detailed description when read in connection with the accompanying drawings. Included in the drawings is the following features:

FIG. 1 schematically shows the sending and receiving of data packets by a vehicle via a WLAN connection taking account of frame types.

DETAILED DESCRIPTION OF THE PREFERRED EMBODIMENTS

The 802.11 standard essentially defines two layers:

(a) the physical layer defines the physical transportation medium (frequency, modulation . . . ) and the rudimentary transportation of databytes.

(b) the MAC-layer is responsible for data protection, data flow control and subscriber management at a slightly higher level, this taking place, inter alia, by means of various types of data packets/frames (a data frame may be a data packet, for example a datagram on layer 2 of the OSI model). Hence, the MAC layer allows data packets to be transported safely via WLAN to defined receiving stations (for example in a vehicle), inter alia.

Data originating from higher layers (in the OSI standard model) (for example data originating from (http-based applications) are packed by a MAC layer device into a frame which comprises a header, the actual data (user data) and a frame check sequence. The header in turn contains a "Frame Control" field (35), inter alia, which in turn contains the type of the frame (for example data frame or control frame) and the subtype of the frame. This design is the same for all 802.11 MAC frames.

For some types and subtypes of frames, the 802.11 standard has still not defined any applications, which means that these are free for future expansions and such types and subtypes of current implementations (http/Internet Browser, Multimedia, etc.) are ignored, so that they can be used within the context of this invention. By way of example, the general type number 3 could be used to distinguish data frames relating to C2X communication, or subtypes 8 to 15 of a data frame (for a frame with frame type number 2) could be used to distinguish data frames relating to car-to-X (C2X communication) and hence to allow selection of these frames for C2X applications/devices.

An MAC software driver can be used for the implementation. Such an expanded MAC software driver could then filter out frames or accordingly all packets with the relevant C2X type identifier from the packet stream which it obtains from a physical layer and could forward them directly to a C2X controller module (for example via a software interface or Ethernet, etc) and could package packets which come from a C2X controller into frames of appropriate design and forward them to the physical layer for further sending. This would get around the normal MAC access control or the connection setup for C2X frames, which although safe is lengthy. The C2X controller module could use mechanisms/algorithms, such as that developed by NOW (Network On Wheel), to set up C2X communication—with C2X-specific functions such as geographical routing. Other sources for mechanisms/algorithm are the C2C-CC and the IEEE 1609. For simple functions, such as warning about emergency vehicles by means of a broadcast, these mechanisms/algorithms are not necessary, however. By using an already available field for type recognition in the MAC packets for the expansion, a router modified in this manner would furthermore also allow other communication (for example http/Internet/Multimedia communication). C2X communication would be a simple software add-on for commercially available WLAN routers. When installing WLAN radio engineering in vehicles, this would mean that the hardware which is then present could actually be used for C2X communication only by changing the software.

In this case, it is possible to use conventional hardware as a router. The ever greater prevalence of mobile appliances with WLAN means that it is also possible to couple them to vehicle appliances using Bluetooth, for example, and then to use the WLAN of the mobile appliances as a router, however.

Previous approaches to producing C2X communication using commercially available WLAN routers with commercially available Ethernet protocols (UDP) without other (for example http/Internet/Multimedia) communication in parallel, or the alternative use of routers specified for C2X (for example in the case of the NOW Network On Wheels approach) do not achieve the advantages according to aspects of the invention.

FIG. 1 schematically shows a data frame 31 with a physical layer based on 802.11-PHY (reference 32), an MAC layer based on 802.11-MAC with user data 33 and a header 34, which header 34 contains a frame control data record 35 which contains the frame type 16 (for example type number "2" or type number "3") and an indication of the subtype (for example "8" to "15") with the reference symbol 17 and other details (" . . . "). The data record (frame etc. "1") is sent or received by a transmission/reception device 18 (with a transmitter 19 and a receiver 20) which is arranged or mounted in a motor vehicle 21.

When a data frame 31 is received by a transmission/reception device 18 in the vehicle 21, the data type 16 indicated in the data frame 31 is used on its own—or on the basis of the data type 16 ("2") indicated in the data frame 31 and a subtype 17 ("8", "9", "10" . . . "15") indicated in the data frame 31—to decide whether the data frame is transmitted to a C2X device 22 (for example which can process/display data relating to arriving emergency vehicles or a set of traffic lights with a particular traffic light phase in the direction of travel) or to another communication device 23 (e.g. for surfing the Internet). Accordingly, data coming from the C2X device 22 are provided with an indication 16 of a frame type ("2") representing the C2X communication by the transmitter 19—or with an indication 16 of a frame type ("3") and an indication 17 of a frame subtype ("8" to "15")—and are transmitted via an air interface 30 (that is to say through the air by radio) to a receiver 45 (in a vehicle or in an infrastructure device), where they are received and processed further.

The invention claimed is:

1. A method for deciding about further transmission of data frames received by a receiver in a vehicle via a WLAN connection, the method comprising:
   determining a frame type and subtype indicated in a header of a received data frame;
   transmitting the received data frame to a first processing device in the vehicle when the frame type and subtype is determined to correspond to the first processing device; and
   transmitting the received data frame to a second processing device in the vehicle different than the first processing device in the vehicle when the frame type and subtype is determined to correspond to the second processing device.

2. The method as claimed in claim 1, wherein only one frame type indicated in a received data frame is used to decide about that device to which the data frame is transmitted.

3. The method as claimed in claim 1, wherein at least a frame type is taken as a basis for deciding whether the data are transferred to a device processing C2X data or to a device processing other data.

4. The method as claimed in claim 3, wherein the data are transferred to the C2X device or to the other device by an Ethernet interface or software interface.

5. The method as claimed in claim 1, wherein a data frame with a frame type is transferred to a C2X device.

6. The method as claimed in claim 1, wherein the receiver receives the data via an air interface on the basis of a WLAN-802.11 standard.

7. The method as claimed in claim 1, wherein the receiver receives the data via an air interface on the basis of a WLAN-802.11a, WLAN-802.11b, WLAN-802.11g or an WLAN-802.11n standard.

8. The method as claimed in claim 1,
wherein the frame type is a first un-defined frame type in a communication standard utilized by the receiver that is predefined to correspond to the first processing device, or the frame type is a second un-defined frame type in the communication standard that is predefined to correspond to the second processing device.

9. A method for sending a data frame to a receiver via a WLAN connection comprising the steps of:
providing data frames with data from a device processing C2X data with at least one frame type identifier,
providing other data frames with data from a device processing data other than the C2X data with a different frame type identifier other than the frame type identifier used for data originating from the device processing C2X data, before data frames are sent to the receiver, and
wherein a frame type indicated in a received data frame and a frame subtype are used to decide about that device to which the data frame is transmitted.

10. A method for sending a data frame to a receiver via a WLAN connection comprising the steps of:
providing in a header of data frames with data from a device processing C2X data with at least one frame type and subtype identifier corresponding to the device processing C2X data, and
providing in a header of other data frames with data from a device processing data other than the C2X data with a different frame type identifier corresponding to the device processing data other than the C2X data, the different frame type identifier being different than the frame type identifier used for data originating from the device processing C2X data, the different frame type identifier being provided before data frames are sent to the receiver,
wherein the device processing the data other than the C2X data is different than the device processing the C2X data.

11. A reception device for use in a vehicle comprising:
a decision device for deciding about forwarding received data frames by WLAN to a device processing C2X data or to a device processing other data further based on at least a frame type and subtype in a header of the data frames;
wherein the header is set by a transmitter that transmitted the data frames to the reception device to correspond to the device processing C2X data or the device processing the other data, and
wherein the data is configured to produce a warning signal in the vehicle.

12. A reception device for use in a vehicle comprising:
a decision device for deciding about forwarding received data frames by WLAN to a device processing C2X data or to a device processing other data further on a basis of at least a frame type and subtype of the data frames,
wherein the decision device takes account not only of a frame type but also of a frame subtype of the data frame in a decision, and
wherein the device processing the data other than the C2X data is different than the device processing the C2X data.

13. A transmission device for use in a vehicle for sending data frames comprising:
a distinguishing device for distinguishing data frames with at least one frame type and subtype in a header of the data frames which originate from and correspond to a C2X device prior to sending, and for distinguishing data frames with a frame type in a header of the frames other than a frame type with which data packets originating from the C2X device are distinguished which originate from and correspond to a device other than the C2X device;
wherein the data frames are transmitted to a receiver with the header allowing the receiver to distinguish that the data frames originated from the C2X device or the device other than the C2X device, and
wherein the C2X device is different than the device other than the C2X device.

14. A transmission device for use in a vehicle for sending data frames comprising:
a distinguishing device for distinguishing data frames with at least one frame type which originate from a C2X device prior to sending, and for distinguishing data frames with a frame type other than a frame type with which data packets originating from the C2X device are distinguished which originate from a device other than the C2X device, and
wherein the transmission device, prior to sending to a receiver by WLAN, distinguishes not only the frame type but also a subtype of the data frame differently for data in, a data frame which originate from a C2X device than for data which originate from a device other than the C2X device.

15. A method for deciding about further transmission of data frames received by a receiver in a vehicle via a WLAN connection,
wherein a frame type indicated in a received data frame is used to decide about that device to which data in a data frame are transmitted, and
wherein a frame type indicated in a received data frame and a frame subtype are used to decide about that device to which the data frame is transmitted.

* * * * *

UNITED STATES PATENT AND TRADEMARK OFFICE
CERTIFICATE OF CORRECTION

PATENT NO.        : 8,457,123 B2                                              Page 1 of 1
APPLICATION NO.   : 12/746080
DATED             : June 4, 2013
INVENTOR(S)       : Grotendorst et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 253 days.

Signed and Sealed this
Eighth Day of September, 2015

Michelle K. Lee
*Director of the United States Patent and Trademark Office*